Nov. 10, 1964 W. R. TAYLOR 3,156,325
SPOT-TYPE DISC BRAKES
Filed Dec. 18, 1962 3 Sheets-Sheet 1

INVENTOR
Walter Robert Taylor
BY
Lawrence J. Winter
ATTORNEY

United States Patent Office 3,156,325
Patented Nov. 10, 1964

3,156,325
SPOT-TYPE DISC BRAKES
Walter Robert Taylor, Leamington Spa, England, assignor to Automotive Products Company Limited, Leamington Spa, England
Filed Dec. 18, 1962, Ser. No. 245,465
Claims priority, application Great Britain, Dec. 22, 1961, 46,013/61
11 Claims. (Cl. 188—73)

This invention relates to fluid pressure operated disc brakes of the kind in which fluid pressure actuated motor cylinders are provided on both sides of the brake disc, the invention having for its object to provide improvements in the construction of disc brakes of this kind whereby actuation of the brake can be effected either by the joint actuation of the motor cylinders on both sides of the brake disc or by operation of the motor cylinder or cylinders on one side or the other of the brake disc.

According to the invention a disc brake comprises movable members supported so as to be capable of relative rectilinear sliding movement or pivotal movement in a plane perpendicular to the plane of rotation of the brake disc and a motor cylinder or cylinders mounted on one or both of the movable members so as to be disposed on either side of the brake disc, the admission of pressure fluid to the motor cylinder or cylinders on one side or the other of the brake disc resulting in movement of a brake pad or pads on one side of the brake disc into contact therewith and relative movement between the movable members to move the brake pad or pads on the other side of the brake disc into contact therewith.

A disc brake according to the invention may comprise for example two movable members each of which is formed so as to embrace a peripheral portion of the brake disc and brake pads disposed on either side of the brake disc. One of the movable members has at least two motor cylinders mounted thereon disposed on either side of the brake disc the motor cylinder or cylinders on one side of the brake disc being disposed with the piston or pistons facing the brake pad or pads on the corresponding side of the brake disc, the motor cylinder or cylinders on the other side of the brake disc having the piston or each piston facing away from the brake disc so as to be engageable with an abutment surface or surfaces of the other movable member. The arrangement is such that upon admission of pressure fluid to the motor cylinder or motor cylinders on one or the other side of the brake disc, the relative movement of the pistons and cylinders under the action of the pressure fluid results in relative movement between the movable members and movement of the brake pads on both sides of the brake disc into contact with the brake disc.

The movable members for a disc brake according to the present invention are advantageously of the "closed loop" construction disclosed in the specification of co-pending British application No. 31,385/60, the movable members being supported for rectilinear sliding movement as disclosed in the specification of such prior application or supported so as to be capable of swinging movement as disclosed in the specification of co-pending British application No. 35,727/60.

In an alternative form of disc brake according to the invention a motor cylinder or motor cylinders is or are mounted on each movable member, the motor cylinder or cylinders of one movable member being on one side of the brake disc and those of the other movable member on the other side of the brake disc. The motor cylinders on the opposite sides of the brake disc are arranged with the pistons facing the brake disc the cylinder of the brake disc or each motor cylinder on one side of the brake disc being operatively associated with the movable member carrying the motor cylinder or cylinders on the other side of the brake disc so that upon the admission of pressure fluid to the cylinder or cylinders at least on one side of the brake disc both movable members will be caused to move in opposite directions and the brake pad or pads on opposite sides of the brake disc brought into contact therewith.

Embodiments of the invention will now be described by way of example by aid of the accompanying diagrammatic drawings in which.

Figure 1:
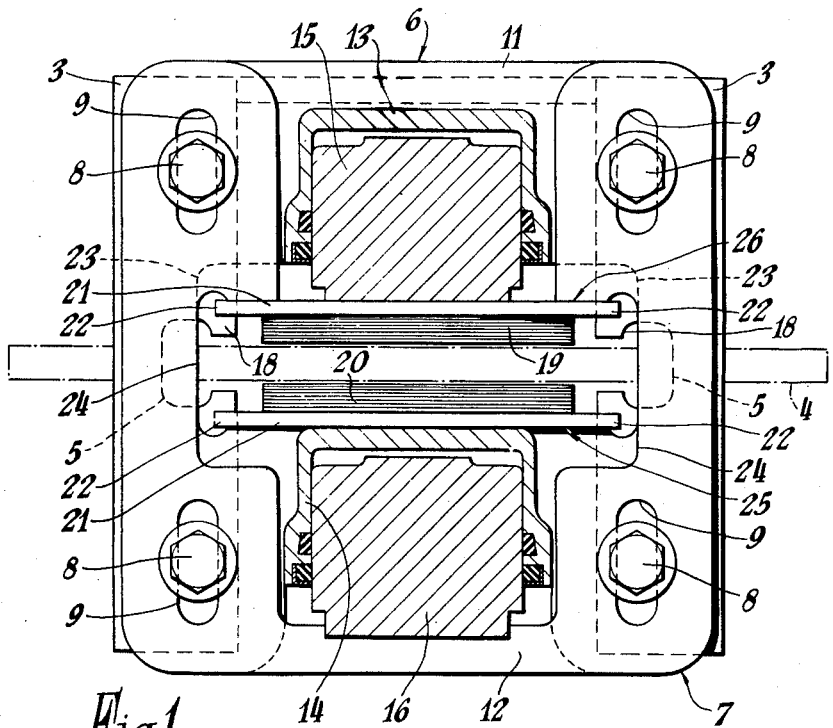
FIGURE 1 is a plan view partly in section of a disc brake according to one embodiment of the invention.
Figure 2:
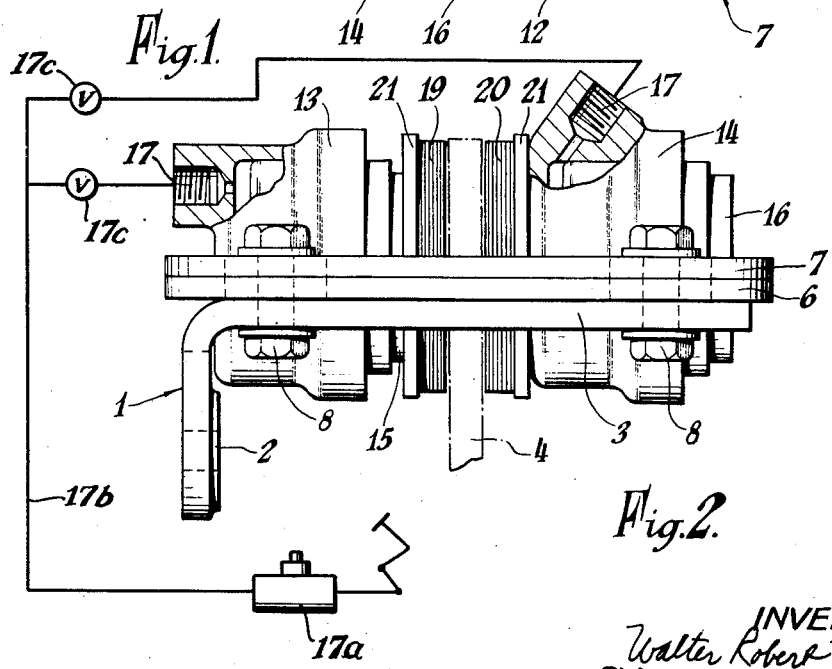
FIGURE 2 is a side view of the disc brake as seen from the left of FIGURE 1.

The disc brake shown in FIGURES 1 and 2 of the accompanying diagrammatic drawings comprises a fixed support indicated generally by reference numeral 1 and consisting of a web portion 2 having flange portions 3 spaced apart from one another and extending laterally from one edge of the web portion at right angles thereto. The fixed support is adapted to be secured to the fixed part of a wheel assembly by bolts passing through holes in the web portion 2 the flanges extending parallel to the axis of rotation of the brake disc 4, the opposite edges of the flanges each having a cut-out 5 providing clearance for the periphery of the brake disc a peripheral portion of which extends into the gap between the flanges 3.

The flanges 3 provide support for two movable members 6 and 7 arranged one on the other and capable of rectilinear sliding movement relative to one another in the direction of the axis of rotation of the brake disc, the movable members being guided during movement by bolts 8 passing through slots 9 in the movable members. The bolts are carried by the flanges 3 of the fixed support and also serve to restrain the movable members from "lifting" off the flanges. Springs (not shown) can be disposed between the bolt heads and the radially outer movable member 7. Each movable member is substantially U shape in plan, the members being assembled one on the other with the closed ends on opposite sides of the brake disc, the closed end 11 of the movable member 6 being wider than the closed end 12 of the radially outer movable member 7. The movable member 6 carries two hydraulic cylinders 13 and 14 arranged coaxially with one another with their respective pistons 15, 16 facing the same way the axes of the pistons being parallel to the axis of rotation of the brake disc, each hydraulic cylinder having connections 17 for coupling the same in the hydraulic circuit of a braking system. The hydraulic cylinder 13 is disposed in a cut-away portion in the closed end 11 of the movable member 6 the hydraulic cylinder 14 being disposed between the limbs of this member, the hydraulic cylinders being spaced from one another so as to be positioned one on either side of the brake disc with the piston 15 of the hydraulic cylinder 13 facing the brake disc, the piston 16 of the other hydraulic cylinder facing away from the brake disc. The hydraulic cylinders can be secured in position by for example welding. The movable members when assembled surround the brake disc and lie in a chordal plane thereof, a peripheral portion of the brake disc extending into the gap 18 between the hydraulic cylinders 13 and 14, brake pads 19 and 20 being provided one on either side of the disc 4. The brake pad 19 is disposed between the outer end of the piston 15 and the brake disc 4 the brake pad 20 being between the closed end of the hydraulic cylinder 14 and the brake disc. Each brake pad is carried by a metal backing plate 21 each of which has laterally extending shoulders 22 which rest on the movable member 6 to support the brake pads radially. The limbs of the movable members 6 and 7 are each provided with cut-away portions 23, 24 respectively. The ends 25 of the cut-away portions 23 provide abutments engageable with the adjacent face of the metal backing plate 21 of the brake pad 20, the ends 26 of the cut-away portion 24 providing abutments engageable with the adjacent face of the metal backing plate 21 of the brake pad 19.

In operation upon the admission of pressure fluid to the hydraulic motor cylinder 13 having the piston 15 facing the brake disc 4, the piston displacement will result in movement of the corresponding brake pad 19 into contact with the brake disc 4 the reaction force set up resulting in movement of the movable member 6 to the left (FIGURE 2), the brake pad 20 thus being moved into contact with the disc due to engagement of the closed end of the hydraulic cylinder 14 and the abutments 25 with the metal backing plate of the pad 20. If however pressure fluid is admitted to the hydraulic cylinder 14 and not to cylinder 13, the reaction force set up as a result of movement of brake pad 20 into contact with the brake disc 4 causes relative movement between the movable members in opposite directions, the member 6 moving to the left and member 7 to the right (FIGURE 2) the movement of member 7 causing the abutments 26 to engage the metal backing plate 21 of the brake pad 19 to pull this pad into contact with the brake disc.

It will be appreciated that fluid pressure can also be supplied simultaneously to the hydraulic motor cylinders on both sides of the brake disc. Thus the cylinders on each side of the brake disc can be connected to a common source of fluid pressure, the supply of pressure fluid being controlled by means, selectively operable to supply pressure fluid to the motor cylinder or motor cylinders on one side or the other of the brake disc, or simultaneously to the motor cylinders on both sides of the brake disc. Alternatively independent sources of supply can be provided for the motor cylinders on the opposite sides of the brake disc, suitable control means being provided if required, to permit such motor cylinders to be actuated simultaneously or independently. This feature of the present invention has considerable advantages and provides for the solving of a number of problems now existing in braking systems. For example the braking of vehicles in laden or unladen condition from the same system is simplified by providing a second system which can be brought into operation when the vehicle is being operated in a laden condition.

Figure 3:
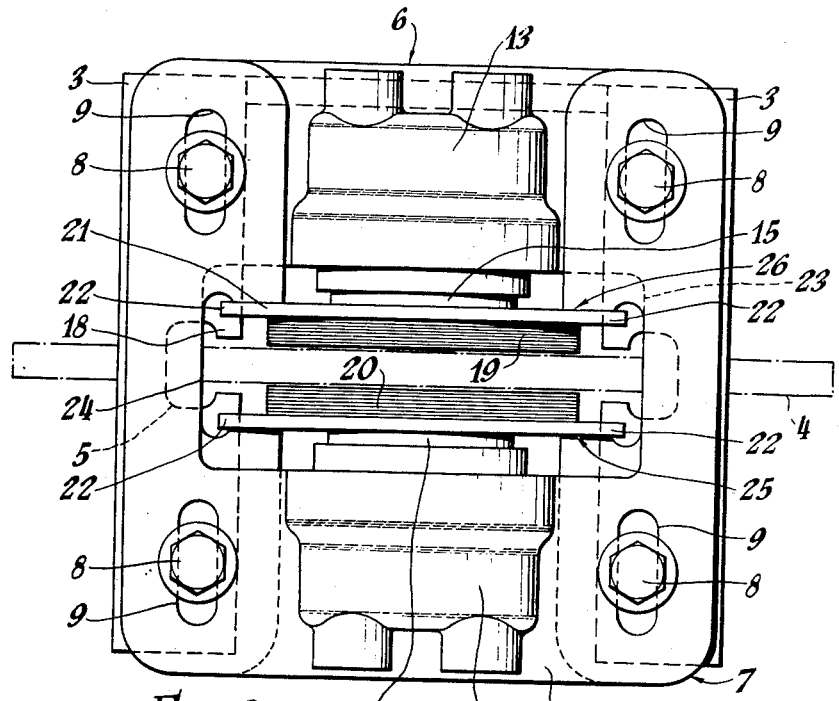
FIGURE 3 is a plan view of a disc brake according to another embodiment of the invention.

The disc brake shown in FIGURES 3 and 4 of the accompanying drawings is substantially identical in construction to that described in connection with FIGURES 1 and 2 and accordingly the same reference numerals have been used to indicate corresponding parts. In the present embodiment however the hydraulic motor cylinder 14 is carried by the movable member 7 and is arranged with its piston 16 facing the brake disc, the hydraulic motor cylinder 13 being arranged as previously described, on the movable member 6.

Figure 5:
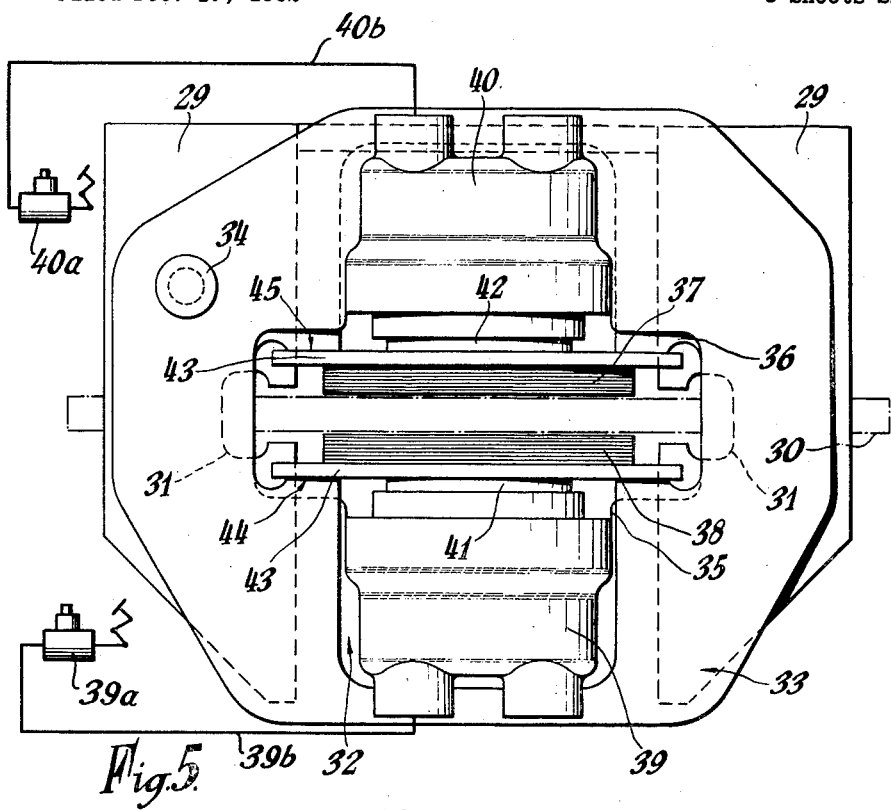
FIGURE 5 is a plan view of a disc brake according to a further embodiment of the invention.
Figure 6:
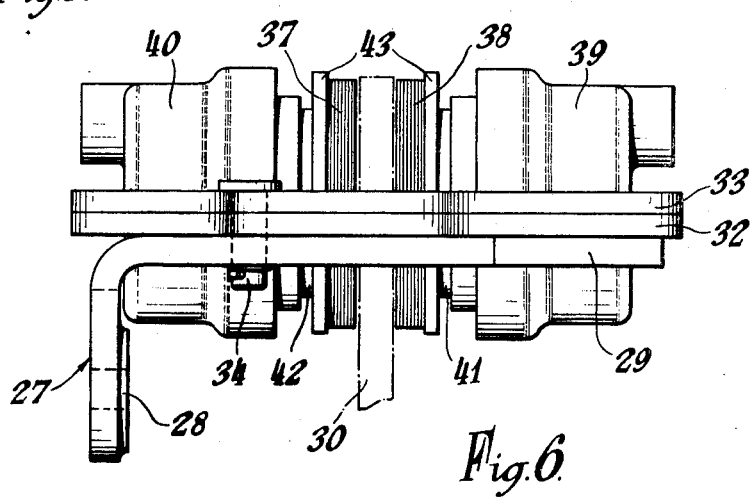
FIGURE 6 is a view of the disc brakes of FIGURE 5 as seen from the left of this figure.

In the further embodiment of the invention shown diagrammatically in FIGURES 5 and 6 of the accompanying drawings the movable members of the disc brake are pivotally mounted so as to be capable of swinging movement, the said movable members being of closed loop construction.

The disc brake comprises a fixed support indicated generally by the reference numeral 27 and consisting of a web portion 28 and a pair of flanges 29 spaced apart from one another and each extending laterally to one side of the web portion at right angles thereto. The fixed support is adapted to be secured to a fixed part of a wheel assembly by bolts passing through bolt holes in the web portion 28 the flanges extending parallel to the axis of rotation of the brake disc 30 a peripheral portion of which extends into the gap between the flanges, each said flange having a cut-away portion 31 providing clearance for the brake disc. The flanges 29 provide support for two movable members 32, 33 respectively arranged one on the other and pivotally mounted on a pivot pin 34 supported by one of the flanges 29 and extending at right angles thereto so that the movable members are capable of swinging movement in a plane at right angles to the plane of rotation of the brake disc 30.

Each movable member is of closed loop construction and consists of a metal plate having an aperture, the aperture of the movable member 32 being indicated at 35 and the aperture of the movable member 33 at 36. The apertures are identical and each is formed to provide a slot portion to receive the peripheral portion of the brake disc and brake pads 37, 38 arranged one on either side of the brake disc, a further portion of each aperture being adapted to receive a hydraulic motor cylinder, the cylinder carried by the movable member 32 being indicated by the reference numeral 39 and the cylinder carried by the movable member 33 indicated by the reference numeral 40. The hydraulic motor cylinders 39 and 40 are arranged co-axially with one another, one on either side of the brake disc and with the piston 41, 42 of each cylinder respectively, facing the brake disc, the outer end of each piston being engageable with the metal backing plates 43 of the brake pads. Each aperture is also formed with edge portions which provide abutments 44, 45 also engageable with the metal backing plates 43 of the brake pads.

As previously described, the hydraulic cylinders can be connected to separate sources of pressure fluid so as to be independently operable. Alternatively the same can be connected to a common source of supply so as to be jointly operable a control valve being included so that the motor cylinders can be independently operated if desired.

In operation, and assuming that the hydraulic motor cylinders 39, 40 are independently operable, upon the admission of pressure fluid to for example the cylinder 39 the piston 41 moves outwardly to press the brake pad 38 into contact with the brake disc. The reaction force created results in swinging movement of the movable member 32 in the clockwise direction (FIGURE 5) relative to the other member 33, so that the brake pad 37 is also moved into contact with the brake disc 30 by engagement of the abutment edges 45 of the movable member 32 with the metal backing plate 43 of the brake pad 37.

FIGURE 2 illustrates diagrammatically a pedal operated master cylinder 17a connected by pipeline 17b to the respective cylinder connections 17. The individual branches of pipe 17b connected to the respective cylinder connections 17 are provided with valve means 17c therein so that the motor cylinders on opposite sides of the brake disc can be connected for operation independently of each other.

Figure 4:
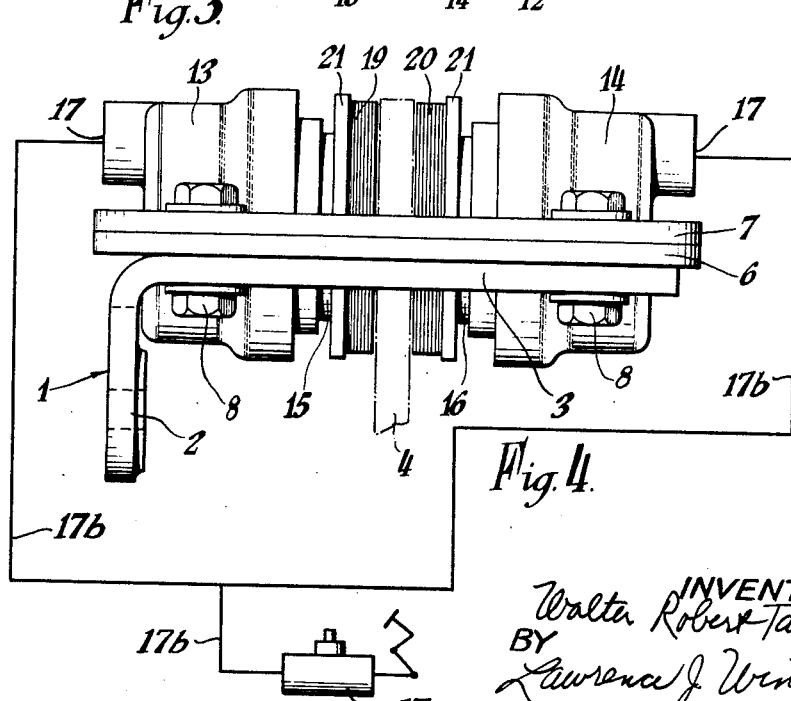
FIGURE 4 is a view of the disc brake of FIGURE 3 as seen from the left of this figure.

Referring to FIGURE 4, a diagrammatic circuit similar to that described in connection with FIGURE 2 is shown except that there are no valve means 17c in this circuit so that the motor cylinders on opposite sides of the brake disc are connected to a common source of fluid supply for joint operation.

Referring to FIGURE 5, two separate pedal operated master cylinders 39a and 40a are shown connected to their respective motor cylinders 39 and 40 by pipelines 39b and 40b, respectively, so that the motor cylinders on opposite sides of the brake disc are connected to separate sources of fluid supply for operation independently of one another.

I claim:

1. A disc brake comprising a fixed support with a horizontal portion, movable members mounted on said horizontal portion of said fixed support, means pivotally connecting said movable members to said fixed support for swinging movement in a substantially horizontal plane about said fixed support, corresponding opening means in said movable members for receiving a disc brake therein, a pad member on each movable member disposed in said opening means, and a motor means mounted on each movable member for moving its respective pad member into contact with the disc brake received in the opening means.

2. A disc brake comprising a horizontally extending fixed support, two horizontally extending movable members disposed on said fixed support, vertical pin means pivotally connecting said movable members on said fixed support and pivotally connecting said movable members to each other to permit said members to pivotally swing in a horizontal plane about said fixed support and to swing horizontally wtih respect to each other, opening means in said movable members for receiving a disc brake therein, a brake pad member carried by each movable member on opposite sides of said opening means for braking said disc brake, and motor cylinder means for each movable member operatively connected to a brake pad member for actuating a pad member.

3. The disc brake of claim 2 wherein said movable members are substantially flat and superimposed one upon the other and are of closed loop construction.

4. The disc brake of claim 3 wherein said motor cylinder means consists of two cylinders disposed on opposite sides of said disc brake, with a piston in each cylinder disposed facing a pad member on the same side of the disc brake as the piston.

5. The disc brake of claim 4 wherein one movable member carries only one of said two cylinders.

6. A disc brake according to claim 4, wherein the motor cylinders are arranged co-axially with one another as oppositely disposed pairs.

7. A disc brake according to claim 4, wherein means are provided for restraining lifting of the movable members during movement thereof.

8. The disc brake of claim 4 and a fluid pressure circuit for supplying pressure fluid to the motor cylinders.

9. The disc brake of claim 4, wherein the motor cylinders on opposite sides of the brake disc are connected to separate sources of fluid supply for operation independently of one another.

10. The disc brake of claim 4, wherein the motor cylinders on opposite sides of the brake disc are connected to a common source of fluid supply for joint operation.

11. The disc brake of claim 4, wherein control valve means are provided to permit operation of the motor cylinders on opposite sides of the brake disc to be operated independently.

References Cited in the file of this patent

UNITED STATES PATENTS

| 3,056,472 | Bessler et al. | Oct. 2, 1962 |
| 3,064,434 | Parrett | Nov. 20, 1962 |
| 3,089,565 | Butler | May 14, 1963 |

FOREIGN PATENTS

| 1,017,034 | Germany | Oct. 3, 1957 |